United States Patent
Ren (10) Patent No.: US 11,163,948 B2
(45) Date of Patent: Nov. 2, 2021

(54) FILE FINGERPRINT GENERATION

(71) Applicant: Beijing DiDi Infinity Technology and Development Co., Ltd., Beijing (CN)

(72) Inventor: Liwei Ren, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 138 days.

(21) Appl. No.: 16/031,364

(22) Filed: Jul. 10, 2018

(65) Prior Publication Data
US 2020/0019605 A1    Jan. 16, 2020

(51) Int. Cl.
| | |
|---|---|
| *G06F 40/205* | (2020.01) |
| *G06F 12/1018* | (2016.01) |
| *G06F 16/31* | (2019.01) |
| *G06F 21/32* | (2013.01) |
| *G06F 21/55* | (2013.01) |

(52) U.S. Cl.
CPC ........ *G06F 40/205* (2020.01); *G06F 12/1018* (2013.01); *G06F 16/325* (2019.01); *G06F 21/32* (2013.01); *G06F 21/556* (2013.01)

(58) Field of Classification Search
CPC .. G06F 12/1018; G06F 16/152; G06F 16/325; G06F 21/32; G06F 21/556; G06F 21/64; G06F 40/12; G06F 40/205
See application file for complete search history.

(56) References Cited

U.S. PATENT DOCUMENTS

| | | |
|---|---|---|
| 6,757,675 B2 | 6/2004 | Aiken et al. |
| 7,260,558 B1 | 8/2007 | Cheng et al. |
| 7,516,130 B2 | 4/2009 | Ren et al. |
| 7,950,062 B1 | 5/2011 | Ren et al. |
| 8,131,751 B1 | 3/2012 | Behzadi et al. |
| 8,161,552 B1 | 4/2012 | Sun et al. |
| 8,359,472 B1 | 1/2013 | Ren et al. |
| 8,549,022 B1 | 10/2013 | Kaminski, Jr. |
| 8,756,249 B1 * | 6/2014 | Wallace ................ G06F 16/148 707/780 |

(Continued)

FOREIGN PATENT DOCUMENTS

| | | |
|---|---|---|
| CN | 101976318 A | 2/2011 |
| CN | 103336890 A | 10/2013 |

(Continued)

OTHER PUBLICATIONS

PCT International Search Report and the Written Opinion dated Mar. 28, 2019, issued in related International Application No. PCT/US2018/067904 (9 pages).

(Continued)

*Primary Examiner* — Irete F Ehichioya
*Assistant Examiner* — Xiaoqin Hu
(74) *Attorney, Agent, or Firm* — Sheppard Mullin Richter & Hampton LLP (57) ABSTRACT

A string of characters within a file may be obtained. A first sequence may be selected from the string of characters. A first hash may be generated based on the first sequence. A second sequence may be selected from the string of characters based on the first sequence. The second sequence may be shifted from the first sequence. A second hash may be generated based on the second sequence. A fingerprint for the file may be generated based on the first hash and the second hash.

16 Claims, 7 Drawing Sheets

(56) References Cited

U.S. PATENT DOCUMENTS

| | | | |
|---|---|---|---|
| 9,471,285 | B1 | 10/2016 | Koohgoli et al. |
| 9,514,312 | B1* | 12/2016 | Antoun ................ G06F 16/137 |
| 2005/0251509 | A1 | 11/2005 | Pontius |
| 2006/0230452 | A1 | 10/2006 | Field |
| 2008/0270991 | A1 | 10/2008 | Ziedman |
| 2009/0006079 | A1 | 1/2009 | Van Caldwell et al. |
| 2009/0100055 | A1* | 4/2009 | Wang ................ G06K 9/00026 |
| 2010/0050177 | A1 | 2/2010 | Goyal et al. |
| 2012/0072725 | A1 | 3/2012 | Fanton et al. |
| 2013/0074186 | A1 | 3/2013 | Muttik |
| 2013/0080398 | A1 | 3/2013 | Booth et al. |
| 2014/0280099 | A1 | 9/2014 | Wang |
| 2015/0106922 | A1 | 4/2015 | Zhao et al. |
| 2016/0299934 | A1 | 10/2016 | Karandikar et al. |
| 2017/0185799 | A1 | 6/2017 | Zheng |
| 2017/0331841 | A1 | 11/2017 | Hu et al. |
| 2020/0125532 | A1 | 4/2020 | Ren et al. |

FOREIGN PATENT DOCUMENTS

| | | |
|---|---|---|
| CN | 110569629 A | 12/2019 |
| EP | 1883023 A1 | 1/2008 |
| WO | 1992/015067 A1 | 9/1992 |

OTHER PUBLICATIONS

Garfinkel., "Fingerprinting Your Files", In: MIT technology review technical report. Aug. 4, 2004, [retrieved on Mar. 9, 2019 at: https://www.technologyreview.com/s/402961/fingerprinting-your-files/], 9 pages.

Schleimer, Saul, et al., Winnowing: Local Algorithms for Document Fingerprinting, Proceedings of the 2003 ACM SIGMOD International Conference on Management of Data, 2003, ACM, 76-85.

PCT International Search Report and the Written Opinion dated Mar. 29, 2019, issued in related International Application No. PCT/US2018/068147 (9 pages).

Sedgewick et al., "Guide to Application Whitelisting", NIST Special Publication 800-167, Oct. 31, 2015.

Non-Final Office Action dated Oct. 15, 2019, issued in related U.S. Appl. No. 16/221,799 (10 pages).

Non-Final Office Action dated Jun. 3, 2021, issued in related U.S. Appl. No. 16/718,082 (20 pages).

PCT International Search Report and the Written Opinion dated Mar. 17, 2021, issued in related International Application No. PCT/CN2020/137327 (9 pages).

PCT International Search Report and the Written Opinion dated Mar. 22, 2019, issued in International Application No. PCT/US2018/067915 (7 pages).

Fang Yu et al., "Fast and Memory-Efficient Regular Expression Matching for Deep Packet Inspection", ANCS '06, Dec. 3-5, 2006, San Jose, California, Proceedings of the 2006 ACM/IEEE Symposium on Architecture for Networking and Communications Systems (10 pages).

Boyer-Moore-Horspool algorithm, en.wikipedia.org, Sep. 10, 2017, https://en.wikipedia.org/wiki/Boyer-Moore-Horspool_algorilhm (retrieved from internet on Jul. 3, 2018).

Boyer-Moore siring-search algorithm, Jun. 12, 2018; https://en.wikipedia.org/wiki/Boyer-Moore_string-,earch_algorilhm (retrieved from internet on Jul. 3, 2018).

Non-Final Office Action dated Jul. 17, 2019, issued in related U.S. Appl. No. 16/031,437 (11 pages).

Non-Final Office Action dated Feb. 25, 2020, issued in related U.S. Appl. No. 16/031,437 (14 pages).

Final Office Action dated Jun. 15, 2020, issued in related U.S. Appl. No. 16/031,437 (15 pages).

Notice of Allowance dated Nov. 4, 2020, issued in related U.S. Appl. No. 16/031,437 (10 pages).

\* cited by examiner

Given:
T = string of characters
L = length of T
w = length of sliding window of hash function
p, b = predefined values Step 1: Initialize hash list FP
Step 2: Calculate hash $h_1 = h(c_1, c_2, \ldots, c_w)$
Step 3: For k=2 to L-w+1:
  Calculate $h_k$ from $h_{k-1}$ – an iterative calculation that uses a portion of the calculation of $h_{k-1}$
  If $h_k = 0$ mod p, append $<h_{k-2}, k-2>$ to the hash list FP
  Keep both $h_k$ and $h_{k-1}$, and discard $h_{k-2}$ as temporary variables Output: FP

FILE FINGERPRINT GENERATION

TECHNICAL FIELD

The disclosure relates generally to generating file fingerprints.

BACKGROUND

File fingerprints may be used to identify files. File fingerprints may be used in file management systems, such as data security systems or data loss prevention systems. For example, file fingerprints may be used in searching for files, classifying files, cleaning files (e.g., file deduplication), comparing file, filtering files (e.g., spam filtering), or protecting documents. If a file fingerprint is not unique, systems that rely on file fingerprint may not function properly. For example, if a system searches for files using file fingerprints and two different files have the same file fingerprint (collision), then a search for one of the files may output both files. File fingerprint collisions may result in improper functioning of data security systems or data loss prevention systems, such as improper security categorization of files or data leaks. File fingerprint collisions may cause waste of computing resources. For instance, significant CPU calculations may be required to detect file fingerprint collisions and recalculate file fingerprints for corresponding files. A file fingerprinting tool that quickly generates file fingerprints while reducing numbers of collisions is desirable.

SUMMARY

One aspect of the present disclosure is directed to a method for generating file fingerprints. The method may comprise: obtaining a string of characters within a file; selecting a first sequence from the string of characters; generating a first hash based on the first sequence; selecting a second sequence from the string of characters based on the first sequence, wherein the second sequence is shifted from the first sequence; generating a second hash based on the second sequence; and generating a fingerprint for the file based on the first hash and the second hash.

Another aspect of the present disclosure is directed to a system for generating file fingerprints. The system may comprise one or more processors and a memory storing instructions. The instructions, when executed by the one or more processors, may cause the system to perform: obtaining a string of characters within a file; selecting a first sequence from the string of characters; generating a first hash based on the first sequence; selecting a second sequence from the string of characters based on the first sequence, wherein the second sequence is shifted from the first sequence; generating a second hash based on the second sequence; and generating a fingerprint for the file based on the first hash and the second hash.

In some embodiments, generation of the first hash may include a first calculation of a hash function based on characters within the first sequence; generation of the second hash may include a second calculation of the hash function based on characters within the second sequence; and the second calculation of the hash function may reuse a portion of the first calculation of the hash function.

In some embodiments, the hash function may include a rolling hash.

In some embodiments, selecting the first sequence from the string of characters may include: dividing the string of characters into string portions; and selecting one of the string portions as a first string portion, the first string portion including the first sequence.

In some embodiments, the string portions may comprise k-grams, the k-grams comprising sequences of k-characters from the string of characters.

In some embodiments, the first string portion may include a first sequence of k-characters from the string of characters; a second string portion may include a second sequence of k-characters from the string of characters; and the second sequence of k-characters may be selected by shifting from the first sequence of k-characters by n-characters.

In some embodiments, shifting from the first sequence of k-characters by n-characters may include shifting from the first sequence of k-characters by one or two characters in a reverse direction.

In some embodiments, shifting from the first sequence of k-characters by n-characters may include shifting from the first sequence of k-characters by one or two characters in a forward direction.

In some embodiments, obtaining the string of characters within the file may include: obtaining the file, the file including text; extracting the text of the file; and normalizing the extracted text of the file.

In another aspect of the disclosure, a system for generating file fingerprints may comprise one or more processors and a memory storing instructions. The instructions, when executed by the one or more processors, may cause the system to perform: obtaining a string of characters within a file; selecting a first sequence from the string of characters; generating a first hash based on the first sequence, wherein generation of the first hash includes a first calculation of a hash function based on characters within the first sequence; selecting a second sequence from the string of characters based on the first sequence, wherein the second sequence is shifted from the first sequence; generating a second hash based on the second sequence, wherein generation of the second hash includes a second calculation of the hash function based on characters within the second sequence and the second calculation of the hash function reuses a portion of the first calculation of the hash function; and generating a fingerprint for the file based on the first hash and the second hash.

In some embodiments, selecting the first sequence from the string of characters may include: dividing the string of characters into string portions, the string portions comprising k-grams, the k-grams comprising sequences of k-characters from the string of characters; and selecting one of the string portions as a first string portion, the first string portion including the first sequence.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that generate or use file fingerprints. By using the same hash function on two related sequences of characters, where one sequence is shifted from the other sequence, unique and robust file fingerprints may quickly be generated for files. The shifting of sequences provides for unique generation of hash to avoid collision while allowing prior calculation of hash to be reused in new calculation of hash. Computing systems that rely on file fingerprints to identify files, such as data security systems or data loss prevention systems, may better perform their tasks as file fingerprints are quickly generated with low probability of collision. For example, the generation of file fingerprints disclosed herein may enable data security systems to more accurately categorize files or data loss prevention systems to better prevent data leaks.

Figure 1:
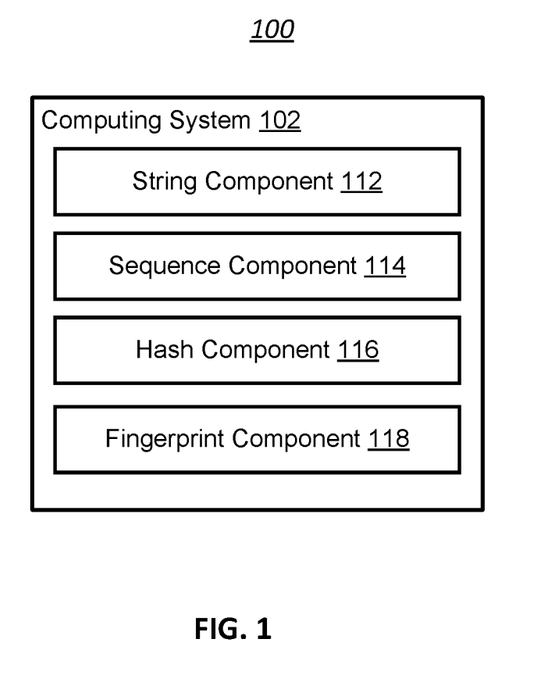
FIG. 1 illustrates an example environment for generating file fingerprints, in accordance with various embodiments of the disclosure.

FIG. 1 illustrates an example environment 100 for generating file fingerprints, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a string component 112, a sequence component 114, a hash component 116, and a fingerprint component 118. The computing system 102 may include other components. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The string component 112 may be configured to obtain one or more strings of characters within a file. A file may refer to a collection of data or information stored in one unit. Data or information may be stored as text of the file. For example, a file may include an electronic document. A file may be identified by one or more file identifiers, such as a file name or a file fingerprint. A file may include multiple characters. A character may refer to a symbol having one or more meanings, such as a symbol forming part of a word, depicting a letter, depicting a numeral, expressing grammatical punctuation, representing mathematical concepts, or representing other information. A character may be selected from letters of a set of letters, numerals of a numbering system, or special symbols (e.g., ampersand symbol "&," percent symbol "%," assign "@"). A string of characters may refer to a sequence of characters. A string of characters may include contiguous characters within a file. The characters/strings of characters within the file may form text of the file. Text of the file may refer to written, printed, or recorded information of the file. Text of the file may include visual representation of information included in the file. A string of characters (T) may have a length (L) and may include characters (c). A string of characters may be written as $T=c_1 c_2 \ldots c_L$.

Obtaining a string of characters may include one or more of accessing, acquiring, analyzing, determining, examining, identifying, loading, locating, opening, receiving, retrieving, reviewing, storing, or otherwise obtaining the string of characters. The string component 112 may obtain the string of characters from one or more locations. For example, the string component 112 may obtain a string of characters from a storage location, such as an electronic storage of the computing system 102, an electronic storage of a device accessible via a network, another computing device/system (e.g., desktop, laptop, smartphone, tablet, mobile device), or other locations. The string component 112 may obtain the string of characters from the file.

In some embodiments, the string component 112 may obtain a string of characters within a file based on a file selection, a file detection, a file upload, or other actions relating to a file. For example, the string component 112 may obtain a string of characters within a file based on a selection of the file by a user or a computing system for fingerprint generation. The string component 112 may obtain a string of characters within a file based on a detection of the file by a computing system. The string component 112 may obtain a string of characters within a file based on the file being uploaded to a computing system. Other actions relating to a file may prompt the string component 112 to obtain a string of characters within the file.

In some embodiments, obtaining a string of characters within a file may include: obtaining the file, the file including text; extracting the text of the file; and normalizing the extracted text of the file. That is, the string component 112 may obtain a string of within a file by obtaining the file including text. The string component 112 may extract the text of the file and normalize the extracted text of the file. The string of characters may be selected from the normalized text of the file. Such process for obtaining strings of characters may enable the computing system 102 to generate file fingerprint for different types of files. For example, files may store information using different formats (e.g., documents of different formats) and the string component 112 may normalize text extracted from the files. For example, the string component 112 may obtain documents of different types (Word document, PDF document, PowerPoint document), extract text of the documents, and normalize the text extracted from the documents as sequences of UTF-8 characters. Such may result in the string component 112 obtaining standardized strings of characters from files that have text encoded differently.

The sequence component 114 may be configured to select multiple sequences from the string of characters. Multiple sequences may be selected from the string of characters to be used in generating a file fingerprint. A sequence may refer to a portion of a string of characters. A sequence may include contiguous characters within a string of characters. Multiple sequences that are selected from the string of characters may be related to each other. For example, the sequence component 114 may select a first sequence from the string of characters and then select a second sequence from the string of characters based on the first sequence. The second sequence may be shifted from the first sequence. At least a portion of the second sequence may overlap with the first sequence. These sequences may be used to generate a file fingerprint which is unique and robust (resilient to change) so that the file fingerprint may uniquely identify the file.

Such selection of multiple sequences from the string of characters may facilitate fast generation of file fingerprints with low probability of collisions. Use of a single sequence of characters from a file to generate a file fingerprint may result in multiple files sharing the same file fingerprint. To reduce the probability of collisions, a single sequence of characters from a file may be processed using multiple functions, such as different hash functions, to generate information for the file fingerprint. However, use of multiple functions (e.g., different hash functions) may increase computation times to generate file fingerprints.

The selection of multiple sequences where one of the sequence is shifted from another sequence enables generation of unique and robust fingerprints. For instance, the first sequence may be selected from the string of characters by using a hash function on one or more sequences of the string. The sequence of the string that results in the hash of the sequence being divisible by p (h mod p=0) may be selected as the first sequence. The second sequence may be selected by shifting away from the first sequence in the forward or reverse direction by a certain number of characters. For example, the second sequence may be selected from the first sequence by shifting away from the first sequence in the forward or reverse direction by one or two characters. Such selection of the second sequence may allow for use of an iterative formula to quickly generate unique and robust file fingerprints. Other selection of the first sequence of from the string of characters are contemplated.

The hash component 116 may be configured to generate hashes based on the multiple sequences from the string of characters. For example, the hash component 116 may generate a first hash based on the first sequence and generate a second hash based on the second sequence. The hash component 116 may generate hashes using the same hash function, such as a rolling hash. The use of a rolling hash may enable quick calculations of hash as a prior calculation of the hash may be reused in a subsequent calculation of the hash. For example, the hash component 116 may generate the first hash by performing a first calculation of a hash function based on characters within the first sequence. The hash component 116 may generate the second hash by performing a second calculation of the same hash function based on characters within the second sequence. The hash component 116 may reuse a portion of the first calculation of the hash function in performing the second calculation of the hash function.

The length (w) of the sliding window of the rolling hash may be set or predefined. The hash function, such as the Karp-Rabin function, may be written as $h(x_1, x_2, \ldots, x_w) = x_1 b^{w-1} + x_2 b^{w-2} + \ldots + x_{w-1}^b + x_w$. This may be an iterative formula with only two additions and two multiplications where $(-b^{w-1})$ is a constant. For example, for k=2 to L−w+1, $h_k$ may be calculated from $h_{k-1}$ with the iterative formula. That is, $h_{k-1}$ may be used when calculating $h_k$ by the iterative formula. The values of b and p may be set/predefined, such as p=1021 and b=2. Use of other values and other hash functions, such as Adler-32, are contemplated.

Such generation of hashes using the same hash function for sequences that are shifted from each other may generate unique values for a file fingerprint. Rather than using two separate hash functions to generate values for a file fingerprint, the same hash function may be used to iteratively generate values for the file fingerprint. The shifting of sequences provides for unique generation of hash to avoid collision while allowing prior calculation of hash to be reused in new calculation of hash.

The fingerprint component 118 may be configured to generate a fingerprint for the file based on hashes of the multiple sequences, such as the first hash and the second hash. For example, the fingerprint component 118 may initialize a hash list and add one or more of the hash values calculated for the selected sequences to the hash list. For example, based on $h_k$ mod p=0, the fingerprint component 118 may add $h_{k-2}$ to the hash list (based on the second sequence being shifted from the first sequence by two characters in the reverse direction). The calculations for $h_k$ and $h_{k-1}$ may be stored for reuse in new hash calculation, and the value for $h_{k-2}$ may be discarded. In some embodiments, other information relating to the selected sequences or the hashes may be used in generating the fingerprint for the file. For instance, in addition to adding $h_{k-2}$ to the hash list, k-2 may be added to the hash list (e.g., appending $<h_{k-2}, k-2>$ to the hash list). The hash list may form the fingerprint for the file. The hash list may be used to generate the fingerprint for the file.

Figure 2:
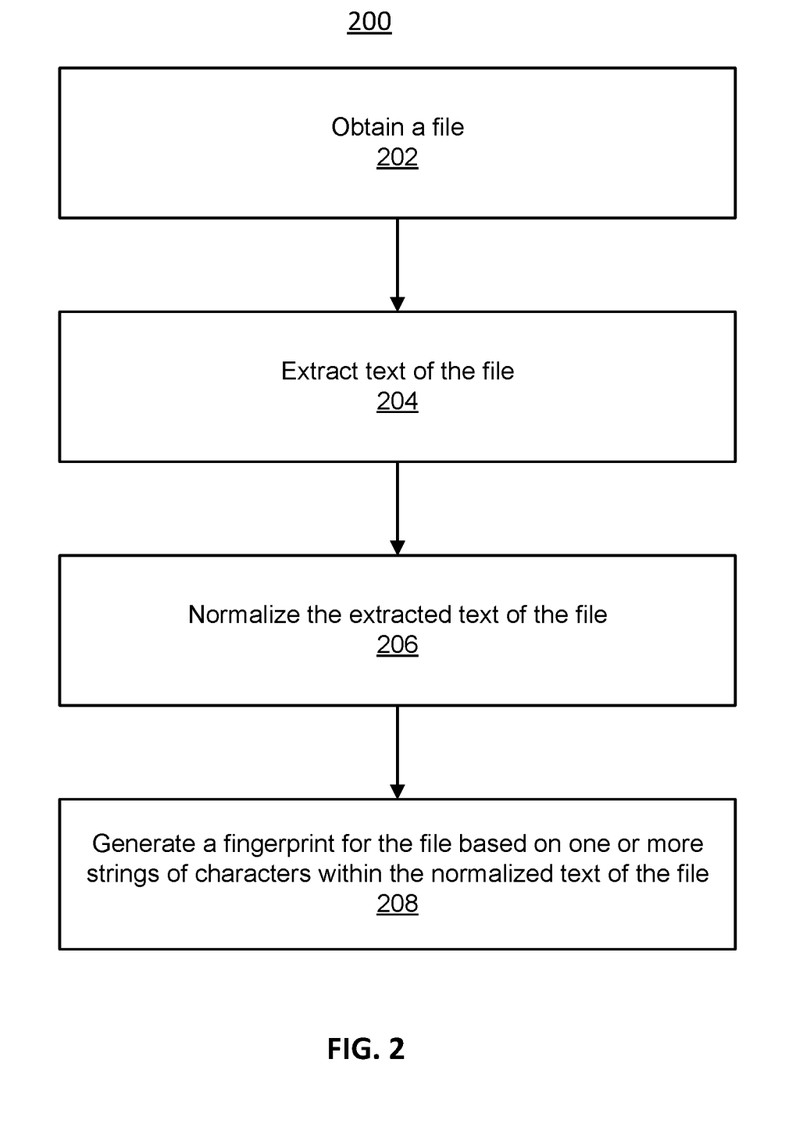
FIG. 2 illustrates an example flow chart for obtaining a string of characters within a file, in accordance with various embodiments of the disclosure.

FIG. 2 illustrates an example flow chart 200 for obtaining a string of characters within a file, in accordance with various embodiments of the disclosure. At block 202, a file may be obtained. The file may include text. At block 204, the text of the file may be extracted. Text extraction may include extracting structured information from unstructured or semi-structured information within the file. At block 206, the extracted text of the file may be normalized. Text normalization may include conversion of the extracted text into a standard form, such as conversion of document into a plain text encoded in UTF-8. Text normalization may include removal of non-informative characters (e.g., white spaces). At block 208, a fingerprint for the file may be generated based on one or more strings of characters within the normalized text of the file.

Figure 3:
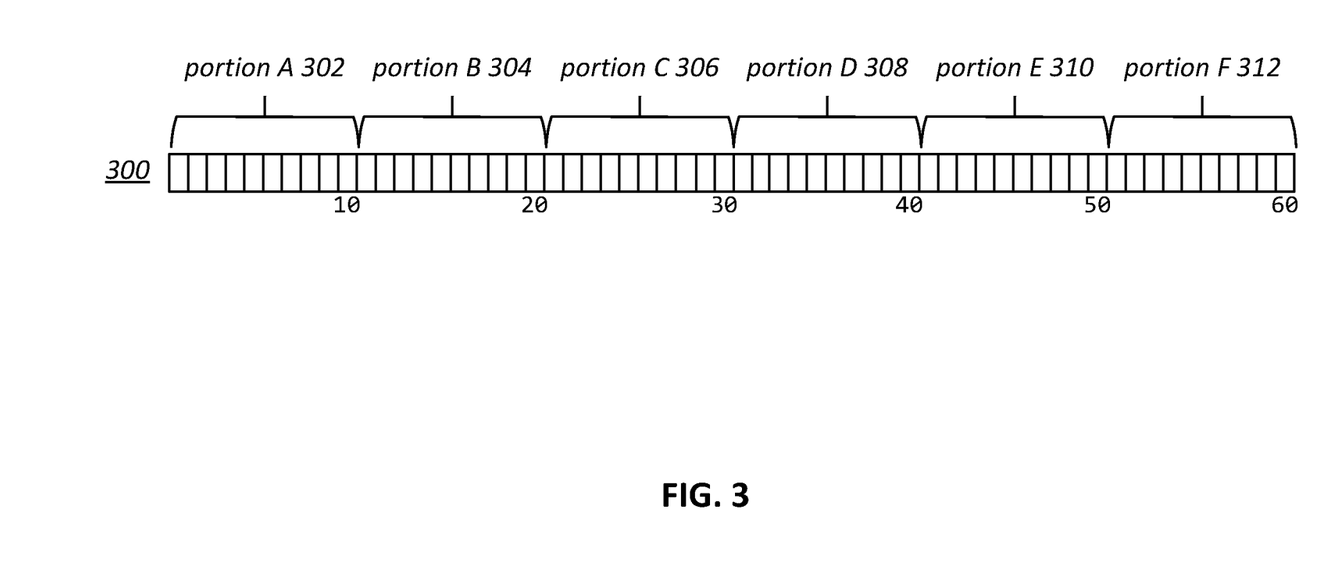
FIG. 3 illustrates an example string of characters and example string portions, in accordance with various embodiments of the disclosure.

FIG. 3 illustrates an example string of characters 300 and example string portions 302, 304, 306, 308, 310, 312, in accordance with various embodiments of the disclosure. One or more sequences of characters may be selected from the string of characters 300 for use in generating file fingerprints. For example, the string of characters 300 may be divided into the string portions 302, 304, 306, 308, 310, 312. The string portions 302, 304, 306, 308, 310, 312 may individually comprise k-grams, where a k-gram comprises a sequence of k-characters (contiguous characters) from the string of characters 300. One of the string portions 302, 304, 306, 308, 310, 312 may be selected as a first string portion to be used in generating file fingerprints. The first string portion may include a first sequence of k-characters from the string of characters 300. For example, the string portion that includes a sequence of k-characters that result in hash being divisible by p may be selected. Other selection of the first string portion are contemplated.

A second sequence may be selected based on the first sequence. The second string portion may include a second sequence of k-characters from the string of characters 300. The second sequence of k-characters may be selected by shifting from the first sequence of k-characters by n-characters. For example, the second sequence of k-characters may be selected by shifting from the first sequence of k-characters by one or two characters in a reverse direction (towards the start of the string of characters 300) or by shifting from the first sequence of k-characters by one or two characters in a forward direction (towards the end of the string of characters 300). In some embodiments, shifting in the reverse direction may be preferred as such shifting would include the beginning part of the first sequence in the second sequence.

Figure 4A:
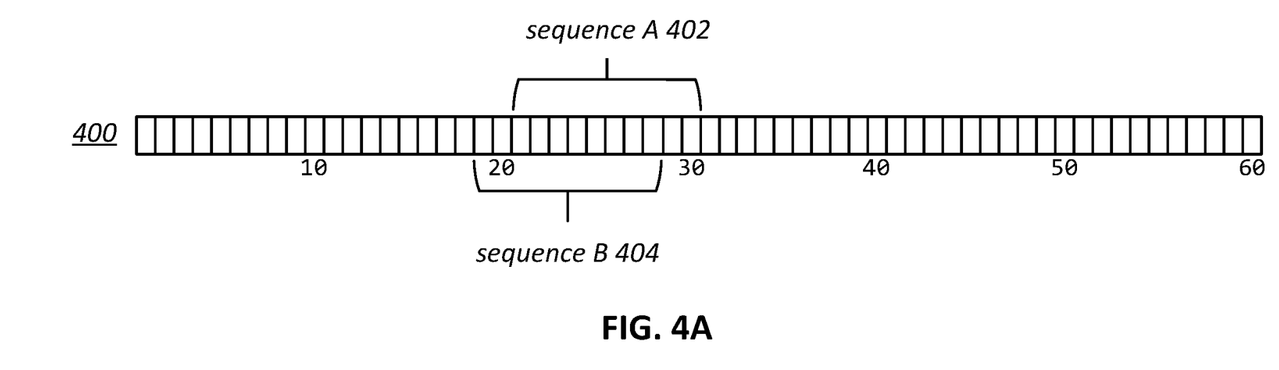
FIG. 4A illustrates example selection of sequences from a string of characters, in accordance with various embodiments of the disclosure.
Figure 4B:
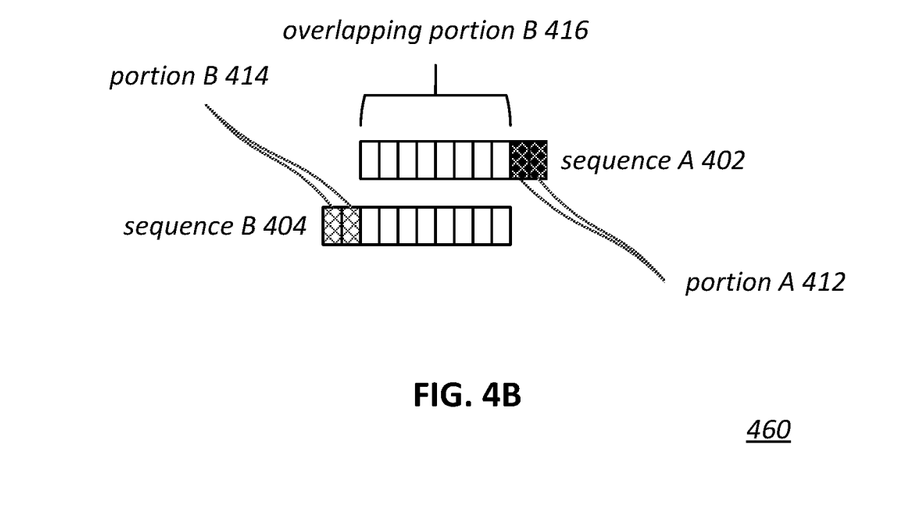
FIG. 4B illustrates example portions of sequences, in accordance with various embodiments of the disclosure.

FIG. 4A illustrates example selection of sequences 402, 404 from a string of characters 400, in accordance with various embodiments of the disclosure. For example, the sequence A 402 may be selected from the string of characters 400 as a first sequence in generating values for file fingerprints. The sequence A 402 may include a ten contiguous characters within the string of characters 400. A first hash may be generated based on the sequence A 402. The generation of the first hash may include a first calculation of a hash function based on the characters within the sequence A 402. The sequence B 404 may be selected from the string of characters 400 as a second sequence in generating values for file fingerprints. The sequence B 404 may include a ten contiguous characters within the string of characters 400. The sequence B 404 may be selected by shifting from the sequence A 402 by two characters in the reverse direction. A second hash may be generated based on the sequence B 404. The generation of the second hash may include a second calculation of the hash function based on the characters within the sequence B 404. The second calculation of the hash function may reuse a portion of the first calculation of the hash function FIG. 4B illustrates example portions 412, 414, 416 of the sequences 402, 404, in accordance with various embodiments of the disclosure. The sequence A 402 may include the portion A 412, which includes two characters at the end of the sequence A 402. The two characters in the portion A 412 may not be included in the sequence B 404. The sequence B 404 may include the portion B 414, which includes two characters at the start of the sequence B 404. The two characters in the portion B 414 may not be included in the sequence A 402. The sequence A 402 and the second B 404 may both include the overlapping portion B 416, which includes eight characters that are in both sequences 402, 404. The calculation of a hash function based on the sequence A 402 may reuse a portion of the calculation of the hash function based on the sequence B 404. That is, calculation of the hash function based on the sequence A 402 may reuse the computation of the hash function using the characters within the overlapping portion B 416. For instance, the calculation of the hash function based on the sequence A 402 may take the prior calculation of the hash function based on the sequence B 404, remove the contribution of the characters within the portion B 414 from the prior calculation, and add to the prior calculation the construction of the characters within the portion A 412.

Figure 5:
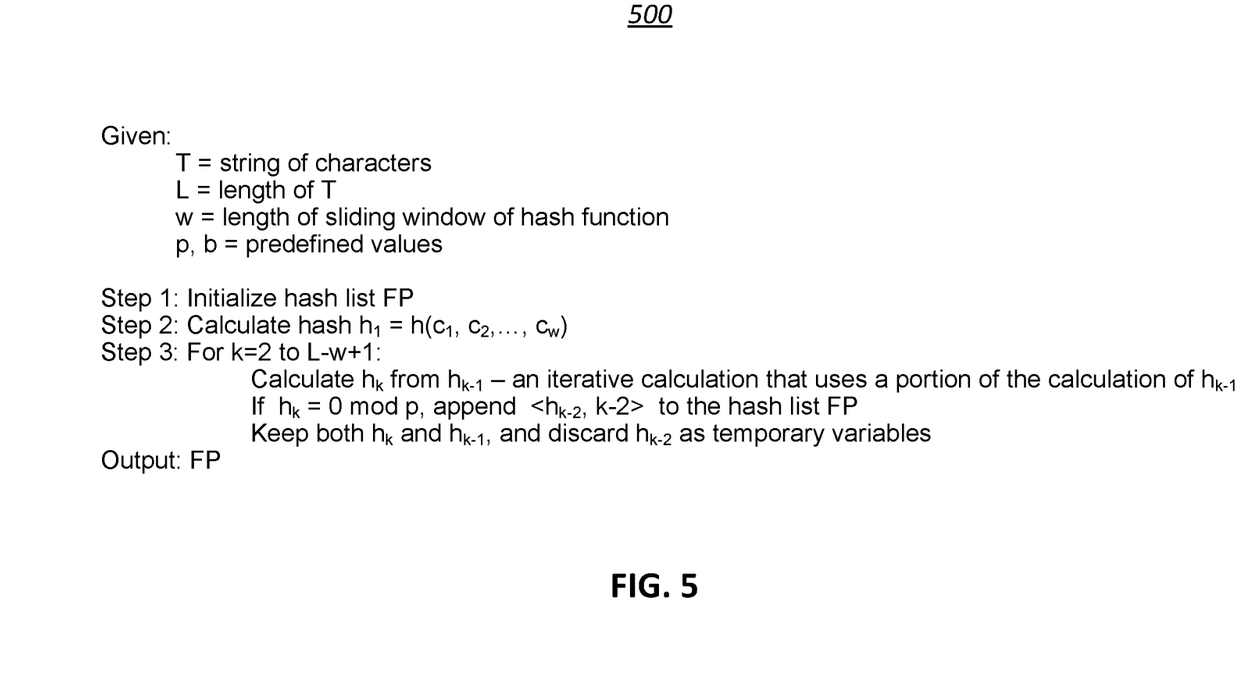
FIG. 5 illustrates an example algorithm for generating file fingerprints, in accordance with various embodiments of the disclosure.

FIG. 5 illustrates an example algorithm 500 for generating file fingerprints, in accordance with various embodiments of the disclosure. Inputs to the algorithm 500 may include a string of characters (T) of length (L), a length of sliding window of rolling hash function (w), and predefined values (p, b). At step 1, a hash list (FP) may be initialized. At step 2, hash $h_1 = h(c_1, c_2, \ldots, c_w)$ may be calculated, such as with Horner's rule. At step 3, for k=2 to L−w+1, the following may be performed: $h_k$ may be calculated from $h_{k-1}$ using an iterative calculation that uses a portion of the calculation of $h_{k-1}$. If $h_k$ mod p=0, the values, $<h_{k-2}, k-2>$ may be appended to the hash list (FP). Both $h_k$ and $h_{k-1}$ may be kept (stored) and $h_{k-2}$ may be discarded as temporary variables. The output of the algorithm 500 may include the hash list (FP).

Figure 6:
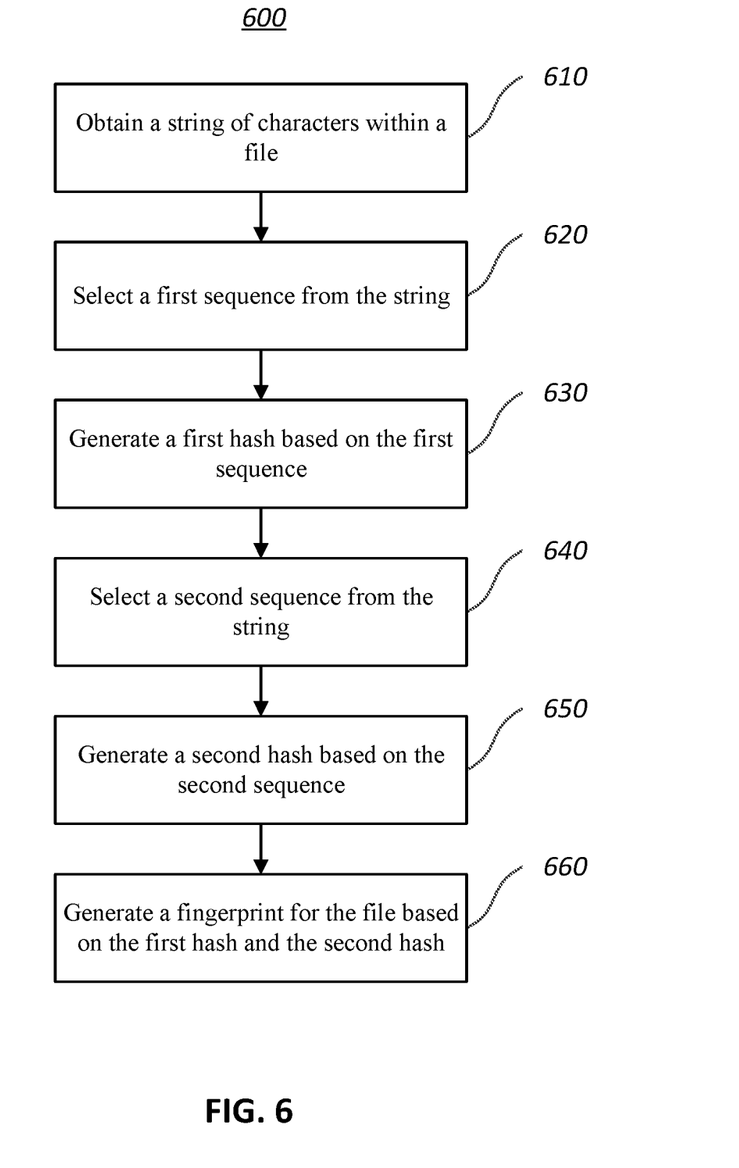
FIG. 6 illustrates a flow chart of an example method, in accordance with various embodiments of the disclosure.

FIG. 6 illustrates a flowchart of an example method 600, according to various embodiments of the present disclosure. The method 600 may be implemented in various environments including, for example, the environment 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, a string of characters within a file may be obtained. At block 620, a first sequence may be selected from the string. At block 630, a first hash may be generated based on the first sequence. Generation of the first hash may include a first calculation of a hash function based on characters within the first sequence. At block 640, a second sequence may be selected from the string. The second sequence may be selected based on the first sequence and shifted from the first sequence. At block 650, a second hash may be generated based on the second sequence. Generation of the second hash may include a second calculation of the hash function based on characters within the second sequence. The second calculation of the hash function may reuse a portion of the first calculation of the hash function. At block 650, a fingerprint for the file may be generated based on the first hash and the second hash.

Figure 7:
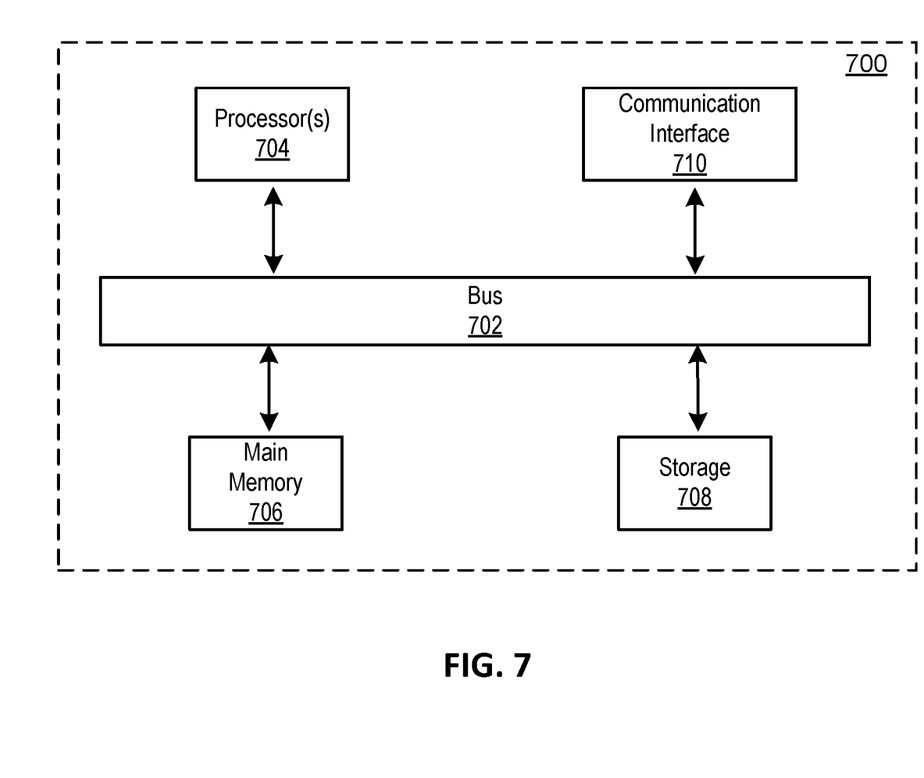
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6 and described in connection with this figure can be implemented by computer program instructions stored in main memory 706. When these instructions are executed by processor(s) 704, they may perform the steps as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A non-transitory computer-readable storage medium for generating file fingerprints, the storage medium storing instructions, when executed by one or more processors, cause the one or more processors to perform operations comprising:
    obtaining a string of characters within a file;
    dividing the string of characters into a plurality of sequences;
    generating a plurality of hashes respectively for the plurality of sequences, wherein generation of each of the plurality of hashes includes a first calculation of a hash function based on characters within the corresponding sequence;
    for each of the plurality of hashes, determining whether the hash is divisible by a predetermined number;
    upon determining that the hash is divisible by the predetermined number, selecting a sequence corresponding to the hash from the plurality of sequences;
    determining a new sequence in the string of characters that is shifted from the sequence by one or two characters in a reverse direction, wherein the new sequence and the sequence have one or more overlapping characters;
    determining a new hash based on the new sequence, wherein generation of the new hash includes a second calculation of the hash function based on characters within the new sequence and the second calculation of the hash function reuses the first calculation of the hash function on the one or more overlapping characters;
    adding at least the determined new hash and an index of the determined new hash to a hash list; and
    generating a fingerprint for the file based on the hash list.

2. The non-transitory computer-readable storage medium of claim 1, wherein the plurality of sequences comprise k-grams, the k-grams comprising sequences of k-characters from the string of characters.

3. A system for generating file fingerprints, the system comprising:
    one or more processors; and
    a memory storing instructions that, when executed by the one or more processors, cause the system to perform:
        obtaining a string of characters within a file;

dividing the string of characters into a plurality of sequences;

generating a plurality of first hashes for the plurality of sequences, wherein generation of each of the plurality of first hashes includes a first calculation of a hash function based on characters within the corresponding sequence;

for each of the plurality of first hashes, determining whether the first hash is divisible by a predetermined number;

upon determining that the first hash is divisible by the predetermined number, selecting a first sequence corresponding to the first hash from the plurality of sequences;

determining a second sequence that is shifted from the first sequence by one or two characters in a reverse direction, wherein the second sequence and the first sequence have one or more overlapping characters;

generating a second hash for the second sequence based on the first hash corresponding to the first sequence, wherein generation of the second hash includes a second calculation of the hash function based on characters within the second sequence and the second calculation of the hash function reuses the first calculation of the hash function on the one or more overlapping characters;

adding at least the second hash and an index of the second hash to a hash list; and generating a fingerprint for the file based on the hash list.

4. The system of claim 3, wherein the hash function includes a rolling hash.

5. The system of claim 3, wherein the dividing the string of characters into a plurality of sequences comprises:

dividing the string of characters into a plurality of sequences that are continuous and equal in length.

6. The system of claim 5, wherein the plurality of sequences comprise k-grams, the k-grams comprising sequences of k-characters from the string of characters.

7. The system of claim 3, wherein the generating a fingerprint for the file based on the hash list comprises:

returning the hash list as the fingerprint for the file.

8. The system of claim 3, further comprising:

adding the first hash and an index of the first hash to the hash list.

9. The system of claim 3, wherein obtaining the string of characters within the file includes:

obtaining the file, the file including text;
extracting the text of the file; and
normalizing the extracted text of the file.

10. A method for generating file fingerprints, the method comprising:

obtaining a string of characters within a file;

dividing the string of characters into a plurality of sequences;

generating a plurality of first hashes for the plurality of sequences, wherein generation of each of the plurality of first hashes includes a first calculation of a hash function based on characters within the corresponding sequence;

for each of the plurality of first hashes, determining whether the first hash is divisible by a predetermined number;

upon determining that the first hash is divisible by the predetermined number, selecting a first sequence corresponding to the first hash from the plurality of sequences;

determining a second sequence that is shifted from the first sequence by one or two characters in a reverse direction, wherein the second sequence and the first sequence have one or more overlapping characters;

generating a second hash for the second sequence based on the first hash corresponding to the first sequence, wherein generation of the second hash includes a second calculation of the hash function based on characters within the second sequence and the second calculation of the hash function reuses the first calculation of the hash function on the one or more overlapping characters;

adding at least the second hash and an index of the second hash into a hash list; and generating a fingerprint for the file based on the hash list.

11. The method of claim 10, wherein the hash function includes a rolling hash.

12. The method of claim 10, wherein the dividing the string of characters into a plurality of sequences comprises:

dividing the string of characters into a plurality of sequences that are continuous and equal in length.

13. The method of claim 12, wherein the plurality of sequences comprise k-grams, the k-grams comprising sequences of k-characters from the string of characters.

14. The method of claim 10, wherein the generating a fingerprint for the file based on the hash list comprises:

returning the hash list as the fingerprint for the file.

15. The method of claim 10, wherein the second sequence is shifted from the first sequence by one or two characters in a forward direction.

16. The method of claim 10, wherein obtaining the string of characters within the file includes:

obtaining the file, the file including text;
extracting the text of the file; and
normalizing the extracted text of the file.

* * * * *